United States Patent
Jeong et al.

(10) Patent No.: US 12,526,667 B2
(45) Date of Patent: Jan. 13, 2026

(54) METHOD AND APPARATUS FOR PERFORMING RRM MEASUREMENT IN NEXT-GENERATION MOBILE COMMUNICATION SYSTEM

(71) Applicant: Samsung Electronics Co., Ltd., Gyeonggi-do (KR)

(72) Inventors: Seungbeom Jeong, Gyeonggi-do (KR); Soenghun Kim, Gyeonggi-do (KR); Sangyeob Jung, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 322 days.

(21) Appl. No.: 18/026,652

(22) PCT Filed: Oct. 12, 2021

(86) PCT No.: PCT/KR2021/014034
§ 371 (c)(1),
(2) Date: Apr. 22, 2023

(87) PCT Pub. No.: WO2022/086023
PCT Pub. Date: Apr. 28, 2022

(65) Prior Publication Data
US 2023/0370876 A1    Nov. 16, 2023

(30) Foreign Application Priority Data
Oct. 22, 2020  (KR) .................. 10-2020-0137806
Jan. 20, 2021  (KR) .................. 10-2021-0008003

(51) Int. Cl.
*H04W 24/08* (2009.01)
*H04B 17/309* (2015.01)
*H04W 8/24* (2009.01)

(52) U.S. Cl.
CPC .......... *H04W 24/08* (2013.01); *H04B 17/309* (2015.01); *H04W 8/24* (2013.01)

(58) Field of Classification Search
CPC ....... H04W 24/08; H04W 8/24; H04B 17/309
(Continued)

(56) References Cited

U.S. PATENT DOCUMENTS

2021/0105643 A1    4/2021  Kim et al.
2021/0105647 A1*   4/2021  Lee .................. H04W 36/0094
(Continued)

FOREIGN PATENT DOCUMENTS

KR    10-2021-0039890        4/2021
WO    WO-2022062962 A1 *     3/2022

OTHER PUBLICATIONS

PCT/ISA/210 Search Report issued on PCT/KR2021/014034, Jan. 14, 2022 pp. 3.
(Continued)

*Primary Examiner* — Nicholas R Taylor
*Assistant Examiner* — Chong G Kim
(74) *Attorney, Agent, or Firm* — The Farrell Law Firm, P.C.

(57) ABSTRACT

The present disclosure relates to: a communication technique for merging an IoT technology with a 5G communication system for supporting a higher data transmission rate than a 4G system; and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. A method and apparatus for performing relaxed radio resource management (RRM) measurement are disclosed.

8 Claims, 12 Drawing Sheets

(58) Field of Classification Search
USPC ........................................................ 370/252
See application file for complete search history.

(56) References Cited

U.S. PATENT DOCUMENTS

| | | | | |
|---|---|---|---|---|
| 2021/0105649 A1* | 4/2021 | Lee | ........................ | H04W 24/10 |
| 2021/0352507 A1* | 11/2021 | He | ..................... | H04W 52/0219 |
| 2022/0007293 A1* | 1/2022 | Kaikkonen | .......... | H04W 36/324 |
| 2023/0130963 A1* | 4/2023 | Yao | ...................... | H04B 17/336 |
| | | | | 370/329 |

OTHER PUBLICATIONS

PCT/ISA/237 Written Opinion issued on PCT/KR2021/014034, Jan. 14, 2022 pp. 4.

Intel Corporation, vivo, "Relaxation of RRM measurements", 3GPP TSG RAN WG2 Meeting #107 R2-1909556 Prague, Czech Republic, Aug. 26-30, 2019, pp. 6.

MediaTek Inc., "Power Saving for RRM Measurements in NR", 3GPP TSG-RAN WG2 Meeting #105bis R2-1903245 Xi'an, China, Apr. 8-12, 2019, pp. 9.

Spreadtrum Communications, "Consideration on power saving for reduced capability NR devices", 3GPP TSG RAN WG1 #101 R1-2003997 e-Meeting, May 25-Jun. 5, 2020, pp. 5.

Vivo, "Summary of RRM measurement relaxation for PowSav", 3GPP TSG-RAN WG2 Meeting #110-e R2-2005861 Electronic, Jun. 1-Jun. 12, 2020, pp. 22.

Vivo, "Summary#1 of UE power Consumption Reduction in RRM Measurements", 3GPP TSG RAN WG1 Meeting #96 R1-1903424 Athens, Greece, Feb. 25-Mar. 1, 2019, pp. 63.

* cited by examiner

METHOD AND APPARATUS FOR PERFORMING RRM MEASUREMENT IN NEXT-GENERATION MOBILE COMMUNICATION SYSTEM

PRIORITY

This application is a National Phase Entry of PCT International Application No. PCT/KR2021/014034, which was filed on Oct. 12, 2021, and claims priority to Korean Patent Application Nos. 10-2020-0137806 and 10-2021-0008003, which were filed on Oct. 22, 2020, and Jan. 20, 2021, respectively, the entire content of each of which is incorporated herein by reference.

TECHNICAL FIELD

The disclosure relates to a method and apparatus for performing relaxed radio resource management (RRM) measurement.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in extremely high frequency (mmWave) bands (e.g., 60 GHz band) so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (COMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

Meanwhile, a terminal may perform RRM measurement on a serving cell and, based on this, perform a cell reselection operation. This RRM measurement operation may vary depending on the mobility of the terminal. For example, in the case of a stationary terminal, the signal strength from the serving cell is highly likely to be maintained, so the RRM measurement for cell reselection may be performed as a more relaxed measurement.

DISCLOSURE OF INVENTION

Technical Problem

The disclosure is intended is to propose a method for performing a more improved RRM measurement relaxation operation for a stationary terminal.

Solution to Problem

According to an embodiment of the disclosure, a method performed by a terminal in a wireless communication system may include receiving, from a base station, a first radio resource control (RRC) message including information on a condition of a stationary type for relaxed measurement; identifying whether the terminal satisfies the condition of the stationary type, based on a measurement of a received signal for a cell of the base station; and transmitting, to the base station, a second RRC message including information indicating stationary characteristics of the terminal, in case that the condition of the stationary type is satisfied.

In addition, according to an embodiment of the disclosure, a method performed by a base station in a wireless communication system may include transmitting, to a terminal, a first radio resource control (RRC) message including information on a condition of a stationary type for relaxed measurement; and receiving, from the terminal, a second RRC message including information indicating stationary characteristics of the terminal, as a response to transmission of the first RRC message, wherein the information indicating the stationary characteristics of the terminal is included in the second RRC message in case that the terminal satisfies the condition of the stationary type, based on a measurement of a received signal for a cell of the base station.

In addition, according to an embodiment of the disclosure, a terminal in a wireless communication system may include a transceiver; and a controller configured to control the transceiver to receive, from a base station, a first radio resource control (RRC) message including information on a condition of a stationary type for relaxed measurement; identify whether the terminal satisfies the condition of the stationary type, based on measurement of a received signal for a cell of the base station; and control the transceiver to transmit, to the base station, a second RRC message including information indicating stationary characteristics of the terminal, in case that the condition of the stationary type is satisfied.

In addition, according to an embodiment of the disclosure, a base station in a wireless communication system may include a transceiver; and a controller configured to control the transceiver to transmit, to a terminal, a first radio resource control (RRC) message including information on a condition of a stationary type for relaxed measurement; and control the transceiver to receive, from the terminal, a second RRC message including information indicating stationary characteristics of the terminal, as a response to a transmission of the first RRC message, wherein the information indicating the stationary characteristics of the terminal is included in the second RRC message in case that the terminal satisfies the condition of the stationary type, based on a measurement of a received signal for a cell of the base station.

Advantageous Effects of Invention

According to an embodiment of the disclosure, there is an effect of reducing energy waste for RRM measurement operations of not only terminals with low mobility but also reduced capability (RedCap) terminals that should be operated without battery charging for a long time.

MODE FOR THE INVENTION

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Figure 1:
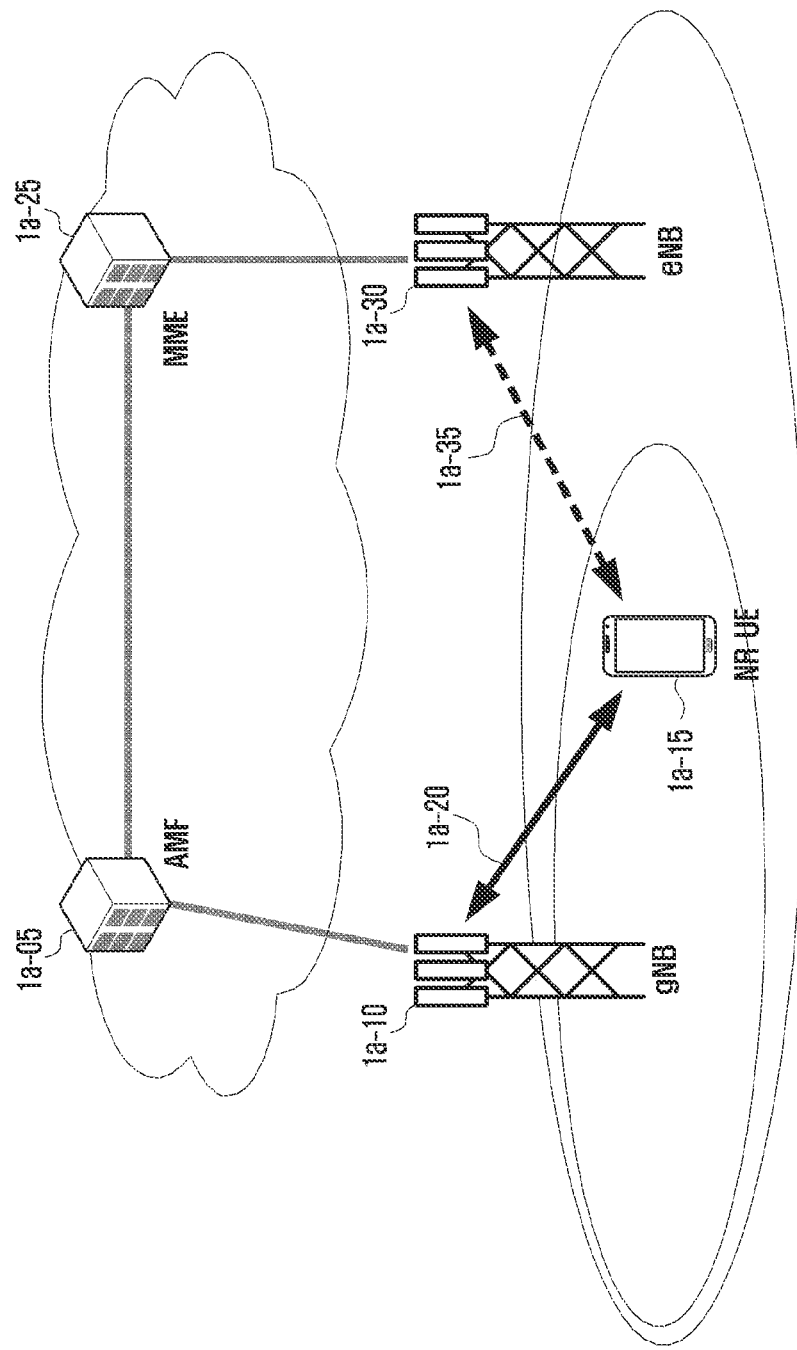
FIG. 1 is a diagram illustrating a structure of a next-generation mobile communication system.

FIG. 1 is a diagram illustrating a structure of a next-generation mobile communication system.

With reference to FIG. 1, as illustrated, a radio access network of the next-generation mobile communication system (new radio, NR) is composed of a next-generation base station (new radio node B, hereinafter gNB) 1a-10 and an AMF (new radio core network) 1a-05. A user equipment (new radio user equipment, hereinafter NR UE or UE) 1a-15 accesses an external network via the gNB 1a-10 and the AMF 1a-05.

In FIG. 1, the gNB 1a-10 corresponds to an evolved Node B (eNB) in the legacy LTE system. The gNB is connected to the NR UE via a wireless channel, and may provide a better service compared to the legacy node B. In the next-generation mobile communication system, all user traffics are serviced via a shared channel, and thus a device that collects state information of UEs, such as a buffer status, an available transmission power status, a channel status or the like, and performs scheduling is needed. The gNB 1a-10 takes charge of this. One gNB generally controls a plurality of cells. In order to implement high-speed data transmission when compared to the legacy LTE, a bandwidth greater than or equal to the legacy maximum bandwidth may be needed, and a beamforming technology may be additionally used by using an orthogonal frequency division multiplexing (OFDM) as a radio access technology. Also, an adaptive modulation & coding (AMC) scheme that determines a modulation scheme and a channel coding rate may be applied based on the channel state of a UE.

The AMF 1a-05 performs functions such as supporting mobility, configuring a bearer, and configuring quality of service (QoS). The AMF 1a-05 is a device that is in charge of various control functions in addition to a mobility management function for the UE, and may be connected to a plurality of base stations. Also, the next-generation mobile communication system may interoperate with the legacy LTE system, and the AMF is connected to an MME 1a-25 via a network interface. The MME is connected to an eNB 1a-30 which is a legacy base station. The UE that supports LTE-NR dual connectivity may transmit and receive data while maintaining a connection to the eNB as well as the gNB (1a-35).

Figure 2:
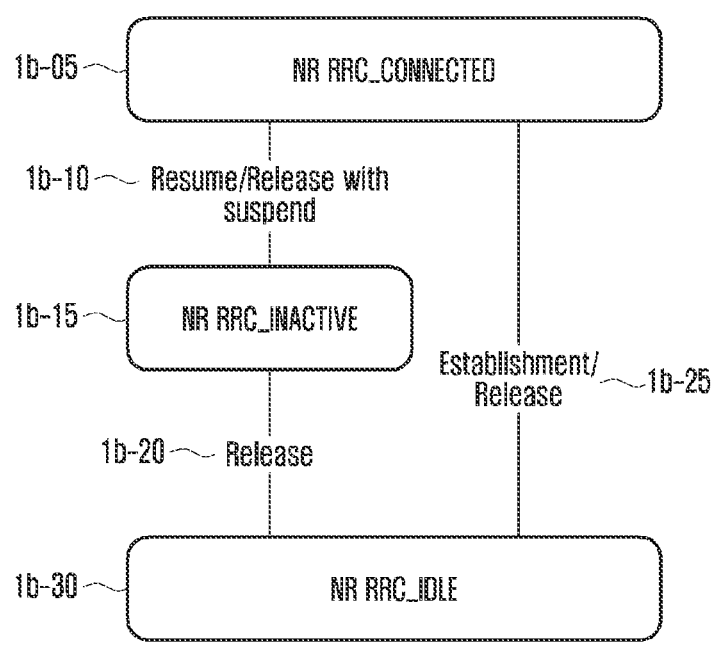
FIG. 2 is a diagram illustrating transition of a radio access state in a next-generation mobile communication system according to an embodiment of the disclosure.

FIG. 2 is a diagram illustrating transition of a radio access state in a next-generation mobile communication system according to an embodiment of the disclosure.

The next-generation mobile communication system has three radio access states (radio resource control (RRC) states). The connected mode (RRC_CONNECTED) 1b-05 may refer to a radio access state in which the UE can transmit and receive data. The idle mode (RRC_IDLE) 1b-30 may refer to a radio access state in which the UE monitors whether paging is received. The connected mode 1b-05 and the idle mode 1b-30 are radio access states that are also applied to the existing LTE system, and the detailed technology is the same as that of the existing LTE system. In the next-generation mobile communication system, the inactive (RRC_INACTIVE) radio access state 1b-15 is newly defined. In the disclosure, the RRC_INACTIVE radio access state 1b-15 newly defined in the next-generation mobile communication system may correspond to an inactive radio access state, an INACTIVE mode, an inactive mode, and the like.

In the inactive mode radio access state 1b-15, UE context is maintained in the base station and the UE, and radio access network (RAN) based paging can be supported. Features of the new radio access state are listed below.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

According to an embodiment, the INACTIVE radio access state may be transitioned to the connected mode 1b-05 or the idle mode 1b-30, using a specific procedure. As indicated by 1b-10, transition from the INACTIVE mode 1b-15 to the connected mode 1b-05 is possible in accordance with the resume procedure, and transition from the connected mode 1b-05 to the INACTIVE mode 1b-15 is possible using the release procedure including suspend configuration information. In this procedure 1b-10, one or more RRC messages may be transmitted and received between the UE and the base station, and the above procedure 1b-10 may consist of one or more steps. Also, through the release procedure 1b-20 after resume, transition from the INACTIVE mode 1b-15 to the idle mode 1b-30 is possible.

Transition between the connected mode 1b-05 and the idle mode 1b-30 can be performed according to the existing LTE technology. That is, through the establishment or release procedure 1b-25, the transition between the connected mode 1b-05 and the idle mode 1b-30 can be made.

Figure 3:
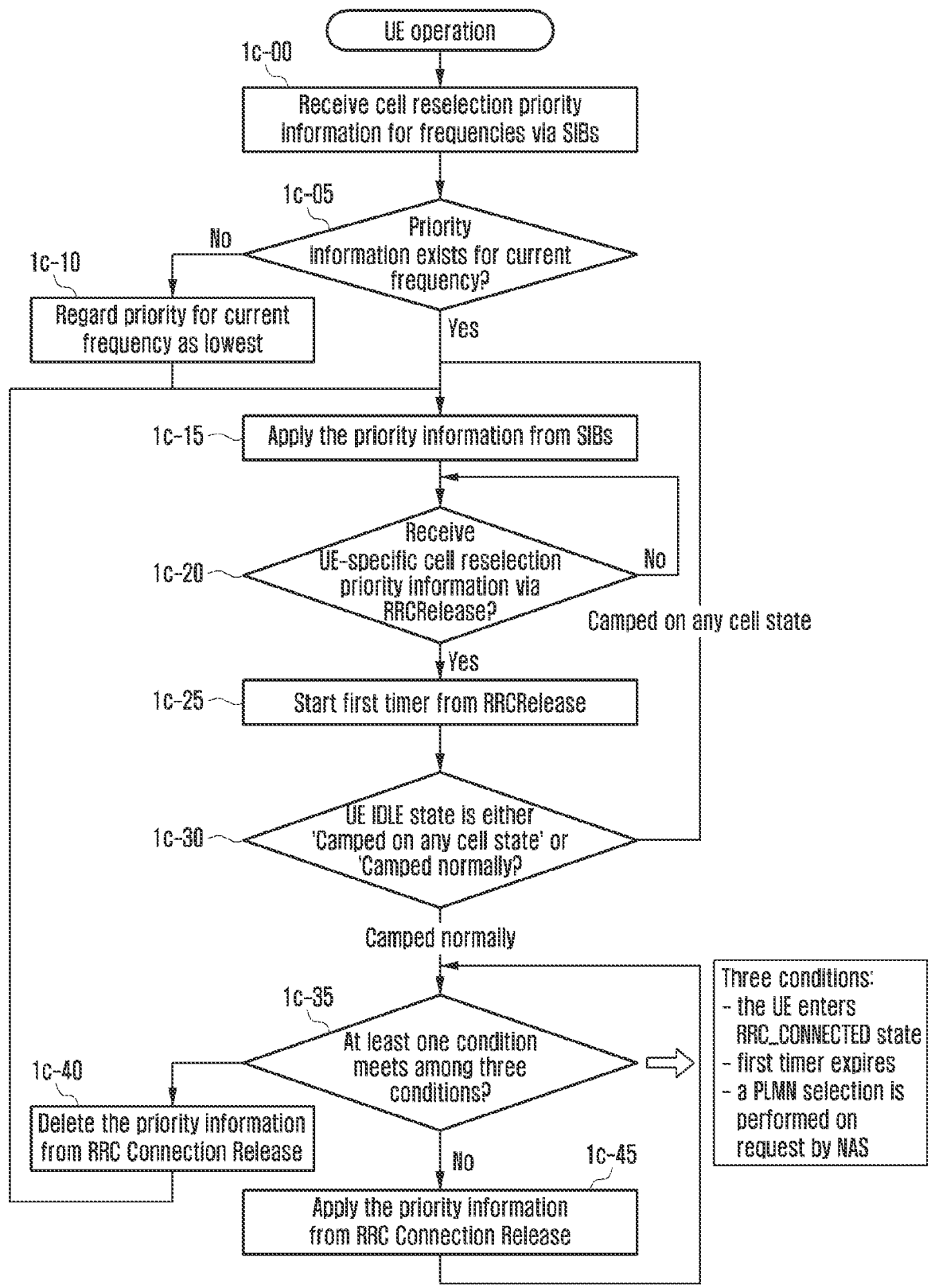
FIG. 3 is a diagram illustrating a process in which priority information per frequency for cell reselection is broadcast through SIB or applied to a specific UE through an RRCRelease message which is dedicated RRC signaling.

FIG. 3 is a diagram illustrating a process in which priority information per frequency for cell reselection is broadcast through system information block (SIB) or applied to a specific UE through an RRCRelease message which is dedicated radio resource control (RRC) signaling.

The cell reselection is a process of reselecting a serving cell so that a moving UE (a UE in the RRC_INACTIVE or RRC_IDLE state) can be connected to a cell with the best channel status. The network assigns priority to each frequency and controls the cell reselection of UEs being in the idle mode. For example, if the UE receives priority information on two frequencies f1 and f2, and if f1 has a higher priority than f2, the probability that the UE stays at f1 increases. In addition, if the channel status of f2 is not good even though the UE is in f2, the UE will try to change the frequency of the serving cell to f1.

The priority information on frequencies is broadcast through SIB or provided to a specific UE through an RRCRelease message which is dedicated RRC signaling. If UE-specific priority information is provided through the RRC signaling even though the UE already has priority information on frequencies through the SIB; the priority information of the SIB is ignored. The priority information of each frequency is delivered through the cellReselection-Priority IE as shown in Table 1 below, and one of eight priorities is assigned. Here, a lower priority value indicates a lower priority. That is, '0' refers to the lowest priority.

[Table 1]

TABLE 1

| CellReselectionPriority information element |
|---|
| -- ASN1START |
| -- TAG-CELLRESLECTIONPRIORITY-START |
| CellReselectionPriority ::=           INTEGEP (0..7) |
| -- TAG-CELLRESLECTIONPRIORITY-STOP |
| -- ASN1STOP |

Frequencies between RATs cannot be given the same priority. If the IDLE state of the UE is 'camped on any cell state', frequency priority information received through SIB is applied, and priority information received through RRC signaling is not used and is only stored. The cellReselectionPriority IE is an optional IE and may not exist. In this case, priority information for a corresponding frequency is not assigned. At this time, the UE regards the priority of the corresponding frequency as the lowest level.

At step 1c-00, the UE receives priority information for frequencies used in not only new radio (NR) but also other radio access technologies (RATs) through SIB. However, priority information is not necessarily provided for all frequencies. Priority information for frequencies of the currently camped serving cell may also not be provided. The UE checks this at step 1c-05. If priority information for the frequency of the current serving cell is not provided, the priority of that frequency is regarded as the lowest level at step 1c-10.

At step 1c-15, the UE applies the priority information of each frequency. Upon receiving the RRCRelease message from the base station, the UE transitions from the connected mode to the idle mode or the inactive mode. The RRC message may include the frequency priority information. This is UE-specific information and is preferentially applied in general over the frequency priority information provided from the SIB. Therefore, at step 1c-20, the UE checks whether the frequency priority information exists in the RRC message. If the frequency priority information exists in the RRC message, the UE starts a first timer at step 1c-25 by applying a first timer value included together. At step 1c-30, the UE determines whether the current idle mode state is a 'camped on any cell state' or a 'camped normal state'. The 'camped normal state' refers to a state in which the UE camps in a suitable cell. The suitable cell is a cell capable of providing a normal service to the UE, and is a cell that satisfies the following detailed conditions.

A cell corresponds to one PLMN in the selected PLMN, registered PLMN, or equivalent PLMN list
An unbarred cell
A cell that satisfies the cell selection criterion The 'camped on any cell state' refers to a state in which the UE fails to camp in a suitable cell and camps in an acceptable cell. In the acceptable cell, a normal service is impossible, and the UE can attempt only an emergency call. The acceptable cell is a cell that satisfies the following conditions.

An unbarred cell
A cell that satisfies the cell selection criterion

If the UE is in the 'camped on any cell state' idle state, the UE returns to the step 1c-15 and applies the frequency priority information provided from the SIB instead of the priority information provided from the RRCRelease message. If the UE is in the 'camped normally' idle state, the UE determines at step 1c-35 whether at least one of the following three conditions is satisfied. The three conditions are as follows.

The UE enters the connected mode
The first timer expires
A PLMN selection process is performed on request by NAS If any one of the above conditions is satisfied, the UE deletes the priority information provided from the RRCRelease message at step 1c-40, returns to the step 1c-15, and applies the frequency priority information provided from the SIB. Otherwise, if neither condition is satisfied, the UE applies the priority information provided from the RRCRelease message at step 1c-45.

The frequency priority information affects the measurement of a specific frequency by the UE. The UE always performs measurement on a frequency having a higher priority than the current serving cell. On the other hand, for the same frequency (intra-frequency) as the serving cell or other frequencies having the same or lower priority than this, measurement is not always performed in order to save UE power.

Whether to perform measurement is determined when the channel quality of service (QoS) of the serving cell is less than or equal to a specific threshold. Because the cell reselection is performed to move to a cell with a good channel status, there is no reason to move to a frequency with the same or lower priority when the channel QoS of the current serving cell is good. Therefore, in order to reduce power consumption due to unnecessary channel measurement, whether to perform measurement is determined based on a specific threshold. In the case of the same frequency (intra-frequency), if the QoS (i.e., Srxlev or Squal) of the serving cell is equal to or lower than the specific threshold Sintrasearch (s-IntraSearchP and s-IntraSearchQ), the channel measurement is performed for other cells of the same frequency. In this case, s-IntraSearchP is an RSRP-based threshold, and s-IntraSearchQ is an RSRQ-based threshold. When both RSRP and RSRQ of the measured serving cell are greater than the threshold, intra-frequency measurement is not performed. For other frequencies (inter-frequency) having the same or lower priority, if the QoS (i.e., Srxlev or Squal) of the serving cell is equal to or lower than the specific threshold Snonintrasearch (s-NonIntraSearchP and s-NonIntraSearchQ), the channel measurement is performed for cells of the corresponding other frequency. In this case, s-NonIntraSearchP is an RSRP-based threshold, and s-NonIntraSearchQ is an RSRQ-based threshold. When both RSRP and RSRQ of the measured serving cell are greater than the threshold, inter-frequency measurement is not performed.

In the disclosure, a state in which channel measurement is performed in intra-frequency or inter-frequency through comparison with the above thresholds is referred to as a normal measurement state, and a state otherwise is referred to as a no measurement state. Regardless of such measurement states, serving cell measurement is always performed.

If the channel QoS of a cell on a higher-priority frequency becomes higher than a specific threshold ThreshX-high during this measurement, the UE reselects the cell on the higher-priority frequency as a serving cell. If the channel QoS of a cell on a lower-priority frequency is higher than a specific threshold ThreshX-low and the QoS of a serving cell is lower than ThreshServing-low, the UE reselects the cell on the lower-priority frequency as a serving cell.

Figure 4:
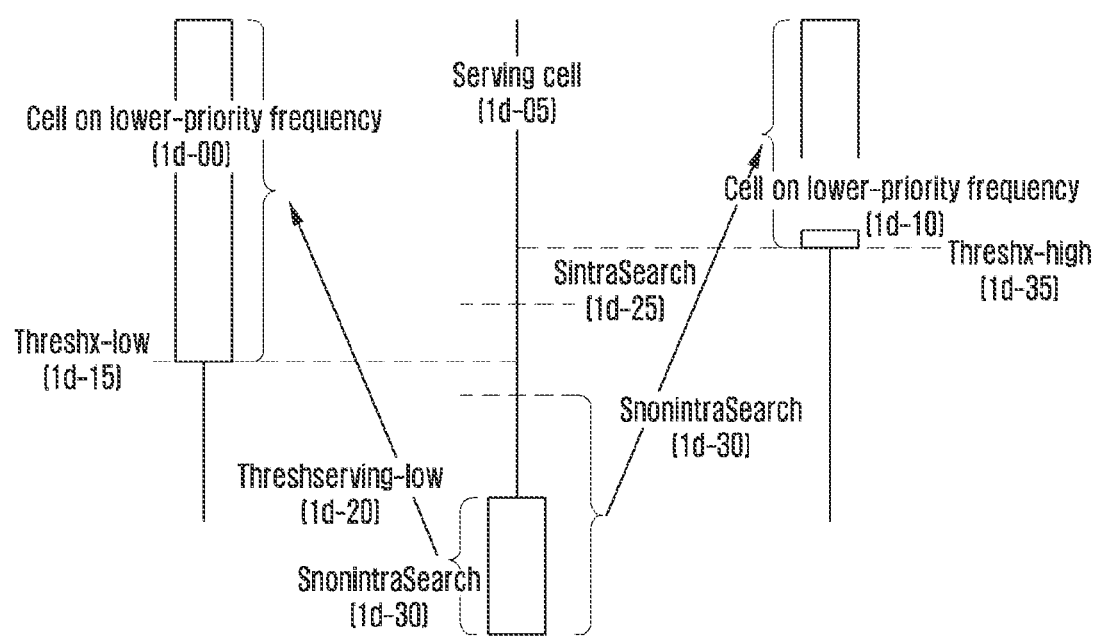
FIG. 4 is a diagram illustrating a method in which a UE performs cell reselection.

FIG. 4 is a diagram illustrating a method in which a UE performs cell reselection.

The UE always performs inter-frequency/RAT measurement for higher-priority frequency or RAT regardless of measured signal strength for a serving cell. If the measured signal strength 1d-05 for the serving cell is lower than SintraSearch 1d-25, the UE performs intra-frequency measurement. If the measured signal strength for the serving cell is lower than SnonintraSearch 1d-30, the UE performs inter-frequency/RAT measurement for a frequency having priority equal to or lower than that of the frequency of the current serving cell. The reason for triggering the UE measurement operation is to reduce power consumption of the UE due to measurement of neighbor cells.

If the channel QoS of a cell 1d-10 on a higher-priority frequency becomes higher than a specific threshold ThreshX-high 1d-35, the UE reselects the cell on the higher-priority frequency as a serving cell. If the channel QoS of a cell 1d-00 on a lower-priority frequency is higher than a specific threshold ThreshX-low 1d-15 and the QoS of a serving cell is lower than ThreshServing-low 1d-20, the UE reselects the cell on the lower-priority frequency as a serving cell.

Upon the cell reselection, received signal strength (RSRP) or received signal quality (RSRQ) may be considered. The received signal strength or received signal quality refers to a value calculated by S-criteria. That is, it is Srxlev or Squal.

$$Srxlev = Qrxlevmeas - (Qrxlevmin + Qrxlevminoffset) - Pcompensation - Qoffsettemp$$

$$Squal = Qqualmeas - (Qqualmin + Qqualminoffset) - Qoffsettemp$$

Here, the meaning of each variable is as described in Table 2 below.

TABLE 2

| | |
|---|---|
| Srxlev | Cell selection RX level value (dB) |
| Squal | Cell selection quality value (dB) |
| Qoffset$_{temp}$ | Offset temporarily applied to a cell as specified in TS 38.331 [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports SUL frequency for this cell, Q$_{rxlevmin}$ is obtained from q-RxLevMinSUL, if present, in SIB1, SIB2 and SIB4, additionally, if Q$_{rxlvminoffsetcellSUL}$ is present in SIB3 and SIB4 for the concerned cell, this cell specific offset is added to the corresponding Qrxlevmin to achieve the required minimum RX level in the concerned cell; else Q$_{rxlevmin}$ is obtained from q-RxLevMin in SIB1, SIB2 and SIB4, additionally, if Q$_{rxlevinoffsetcell}$ is present in SIB3 and SIB4 for the concerned cell, this cell specific offset is added to |

TABLE 2-continued

| | |
|---|---|
| $Q_{qualmin}$ | the corresponding Qrxlevmin to achieve the required minimum RX level in the concerned cell.<br>Minimum required quality level in the cell (dB).<br>Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122 [9]. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122 [9]. |
| $P_{compensation}$ | For FR1, if the UE supports the additionalPmax in the NR-NS-PmaxList, if present, in SIB1, SIB2 and SIB4:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else:<br>$\max(P_{EMAX1} - P_{PowerClass}, 0)$ (dB)<br>For FR2, $P_{compensation}$ is set to 0. |
| $P_{EMAX1}, P_{EMAX2}$ | Maximum TX power level of a UE may use when transmitting on the uplink in the cell (dBm) defined as $P_{EMAX}$ in TS 38.101 [15]. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the p-Max and NR-NS-PmaxList respectively in SIB1, SIB2 and SIB4 for normal UL as specified in TS 38.331 [3]. |
| $P_{PowerClass}$ | Maximum RF output power of the UE (dBm) according to the UE power class as defined in TS 38.101-1 [15]. |

In addition, for a detailed description of measurement rules for cell reselection, refer to TS 38.331 v.16.2.0 as partially captured in Table 3.

TABLE 3

5.2.4.2 Measurement rules for cell re-selection
Following rules are used by the UE to limit needed measurements:
- If the serving cell fulfils Srxlev > $S_{IntraSearchP}$ and Squal > $S_{IntraSearchQ}$, the UE may choose not to perform intra-frequency measurements.
- Otherwise, the UE shall perform intra-frequency measurements.
- The UE shall apply the following rules for NR inter-frequencies and inter-RAT frequencies which are indicated in system information and for which the UE has priority provided as defined in 5.2.4.1:
- For a NR inter-frequency or inter-RAT frequency with a reselection priority higher than the reselection priority of the current NR frequency, the UE shall perform measurements of higher priority NR inter-frequency or inter-RAT frequencies according to TS 38.133 [8].
- For a NR inter-frequency with an equal or lower reselection priority than the reselection priority of the current NR frequency and for inter-RAT frequency with lower reselection priority than the reselection priority of the current NR frequency:
- If the serving cell fulfils Srxlev > $S_{nonIntraSearchP}$ and Squal > $S_{nonIntraSearchQ}$, the UE may choose not to perform measurements of NR inter-frequencies or inter-RAT frequency cells of equal or lower priority;
- Otherwise, the UE shall perform measurements of NR inter-frequencies or inter-RAT frequency cells of equal or lower priority according to TS 38.133 [8].
- If the UE supports relaxed measurement and relaxedMeasurement is present in SIB2, the UE may further relax the needed measurements, as specified in clause 5.2.4.9.

Figure 5:
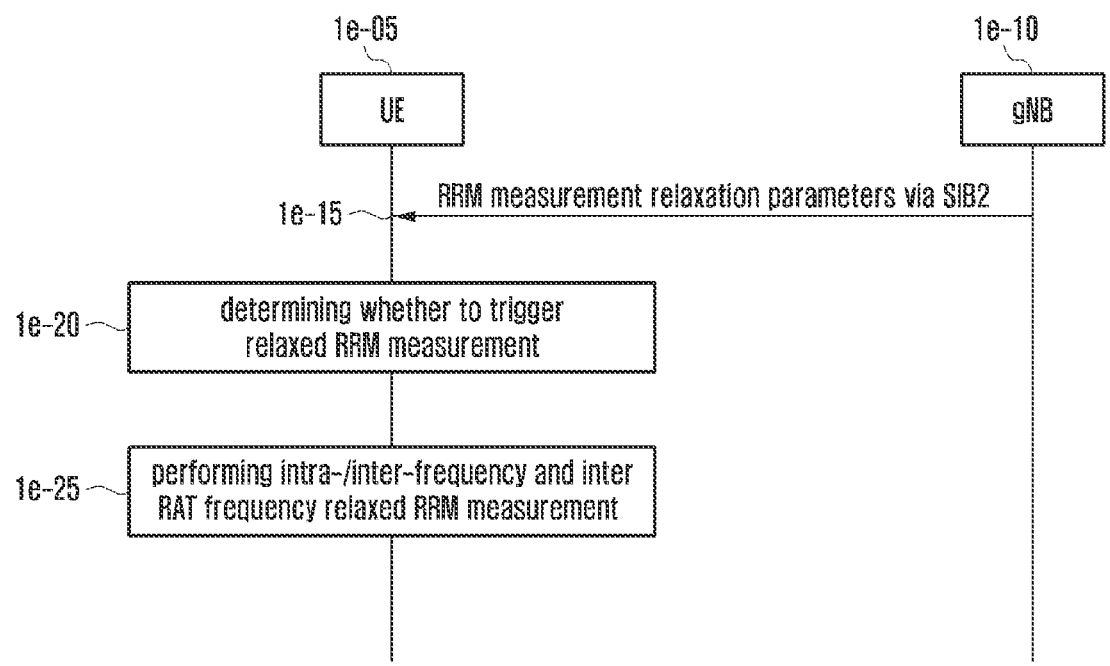
FIG. 5 is a flowchart of a process of performing relaxed RRM measurement in NR.

FIG. 5 is a flowchart of a process of performing relaxed RRM measurement in NR.

A UE 1e-05 that has decided to perform the RRM measurement in accordance with FIG. 4 and Table 3 checks whether relaxedMeasurement is configured in SIB2 (step 1e-15). In the relaxedMeasurement, a plurality of parameters for RRM relaxation are contained as shown in Table 4 partially captured from TS 38.331 v.16.2.0.

TABLE 4

| | | | |
|---|---|---|---|
| relaxedMeasurement-r16 | | SEQUENCE { | |
| | lowMobilityEvaluation-r16 | | SEQUENCE { |
| | | s-SearchDeltaP-r16 | ENUMERATED { |
| | | | dB3, dB6, dB9, dB12, |
| | | dB15, | |
| | | | spare3, spare2, |

TABLE 4-continued

| | | |
|---|---|---|
| sparel}, | | |
| | t-SearchDeltaP-r16 | ENUMERATED { |
| s60, s120, s180, | | s5, s10, s20, s30, |
| | | s240, s300, spare7, |
| spare6, spare5, | | |
| | | spare4, spare3, |
| spare2, sparel} | | |
| } | | |
| OPTIONAL, | -- Need R | |
| cellEdgeEvaluation-r16 | | SEQUENCE { |
| | s-SearchThresholdP-r16 | ReselectionThreshold, |
| | s-SearchThresholdQ-r16 | ReselectionThresholdQ |
| OPTIONAL | -- Need R | |
| } | | |
| OPTIONAL, | -- Need R | |
| combineRelaxedMeasCondition-r16 | | ENUMERATED {true} |
| OPTIONAL, | -- Need R | |
| highPriorityMeasRelax-r16 | | ENUMERATED {true} |
| OPTIONAL | -- Need R | |
| } | | |
| OPTIONAL | -- Need R | |
| ]} | | |

If the relaxedMeasurement is configured in SIB2 and the UE 1e-05 supports relaxed measurement, the UE 1e-05 determines using the parameters whether RRM relaxation can be performed (step 1e-20). If it is determined through the step 1e-20 that the RRM relaxation can be performed, the UE 1e-05 can perform relaxed RRM measurement (step 1e-25).

At the step 1e-20, two relaxed measurement criterions, that is, a low mobility criterion and a not-at-cell-edge criterion, are used. A base station (gNB) may configure only one criterion or configure both criterions. Through the low mobility criterion, the UE 1e-05 can determine that its mobility is low, and through the not-at-cell-edge criterion, the UE 1e-05 can determine that it is not located at the edge of a serving cell. That is, the UE 1e-05, which has low mobility and is located at a place other than the cell edge, has a stable signal strength of the serving cell, so the UE does not need to perform cell reselection to another neighbor cell and can relax the RRM measurement for the neighbor cell. The relaxed RRM measurement can reduce energy consumption because the frequency is measured at a larger period (i.e., less frequently) than the normal RRM measurement. A detailed description about the low mobility criterion and the not-at-cell-edge criterion is as shown in Table 5 partially captured from TS 38.304 v.16.2.0.

TABLE 5

5.2.4.9.1 Relaxed measurement criterion for UE with low mobility
The relaxed measurement criterion for UE with low mobility is fulfilled when:
 - (Srxlev$_{Ref}$ − Srxlev) < S$_{SearchDeltaP}$,
Where:
 - Srxlev = current Srxlev value of the serving cell (dB).
 - Srxlev$_{Ref}$ = reference Srxlev value of the serving cell (dB), set as follows:
 - After selecting or reselecting a new cell, or
 - If (Srxlev − Srxlev$_{Ref}$) > 0, or
 - If the relaxed measurement criterion has not been met for T$_{SearchDeltaP}$:
 - The UE shall set the value of Srxlev$_{Ref}$ to the current Srxlev value of the serving cell.
5.2.4.9.2 Relaxed measurement criterion for UE not at cell edge
The relaxed measurement criterion for UE not at cell edge is fulfilled when:
 - Srxlev > S$_{SearchThresholdP}$, and,
 - Squal > S$_{SearchThresholdQ}$, if S$_{SearchThresholdQ}$ is configured,
Where:
 - Srxlev = current Srxlev value of the serving cell (dB).
 - Squal = current Squal value of the serving cell (dB).

In addition, the method for the UE to determine/perform relaxation at the steps 1e-20 and 1e-25 using the above two criteria is as shown in Tables 6-1 and 6-2 below partially captured from TS 38.304 v.16.2.0. The following Tables 6-1 and 6-2 are linked to each other.

TABLE 6-1

5.2.4.9.0 Relaxed measurement rules
When the UE is required to perform measurements of intra-frequency or NR inter-frequencies or inter-RAT frequency cells according to the measurement rules in clause 5.2.4.2:
  - if lowMobilityEvaluation is configured and cellEdgeEvaluation is not configured; and
  - if the UE has performed normal intra-frequency, NR inter-frequency, or inter-RAT frequency measurements for at least T$_{SearchDeltaP}$ after (re-)selecting a new cell; and
   - if the relaxed measurement criterion in clause 5.2.4.9.1 is fulfilled for a period of T$_{SearchDeltaP}$:
    - the UE may choose to perform relaxed measurements for intra-frequency cells according to relaxation methods in clauses 4.2.2.9 in TS 38.133 [8];
    - if the serving cell fulfils Srxlev > S$_{nonIntraSearchP}$ and Squal > S$_{nonIntraSearchQ}$:
     - for any NR inter-frequency or inter-RAT frequency of higher priority, if less than 1 hour has passed since measurements of corresponding frequency cell(s) for cell (re-)selection were last performed; and,
     - if highPriorityMeasRelax is configured with value true:
      - the UE may choose not to perform measurement on this frequency cell(s);

TABLE 6-1-continued

- else (i.e. the serving cell fulfils Srxlev ≤ $S_{nonIntraSearchP}$ or Squal ≤ $S_{nonIntraSearchQ}$):
  - the UE may choose to perform relaxed measurements for NR inter-frequency or inter-RAT frequency cells according to relaxation methods in clauses 4.2.2.10, and 4.2.2.11 in TS 38.133 [8];
- if cellEdgeEvaluation is configured and lowMobilityEvaluation is not configured; and
- if the relaxed measurement criterion in clause 5.2.4.9.2 is fulfilled:
  - the UE may choose to perform relaxed measurements for intra-frequency cells according to relaxation methods in clauses 4.2.2.9 in TS 38.133 [8];
  - if the serving cell fulfils Srxlev ≤ $S_{nonIntraSearchP}$ or Squal ≤ $S_{nonIntraSearchQ}$:
    - the UE may choose to perform relaxed measurements for NR inter-frequency or inter-RAT frequency cells according to relaxation methods in clauses 4.2.2.10, and 4.2.2.11 in TS 38.133 [8];

TABLE 6-2

- if both lowMobilityEvaluation and cellEdgeEvaluation are configured:
  - if the UE has performed normal intra-frequency, NR inter-frequency, or inter-RAT frequency measurements for at least $T_{SearchDeltaP}$ after (re-)selecting a new cell; and
  - if the relaxed measurement criterion in clause 5.2.4.9.1 is fulfilled for a period of $T_{SearchDeltaP}$; and
  - if the relaxed measurement criterion in clause 5.2.4.9.2 is fulfilled:
    - for any intra-frequency, NR inter-frequency, or inter-RAT frequency, if less than 1 hour has passed since measurements of corresponding frequency cell(s) for cell (re-)selection were last performed:
      - the UE may choose not to perform measurement for measurements on this frequency cell(s);
    - else:
      - if the UE has performed normal intra-frequency, NR inter-frequency, or inter-RAT frequency measurements for at least $T_{SearchDeltaP}$ after (re-)selecting a new cell, and the relaxed measurement criterion in clause 5.2.4.9.1 is fulfilled for a period of $T_{SearchDeltaP}$; or,
      - if the relaxed measurement criterion in clause 5.2.4.9.2 is fulfilled:
        - if combineRelaxedMeasCondition is not configured:
          - the UE may choose to perform relaxed measurements for intra-frequency, NR inter-frequency cells of equal or lower priority, or inter-RAT frequency cells of equal or lower priority according to relaxation methods in clauses 4.2.2.9, 4.2.2.10, and 4.2.2.11 in TS 38.133 [8];
          - if the serving cell fulfils Srxlev ≤ $S_{nonIntraSearchP}$ or Squal ≤ $S_{nonIntraSearchQ}$:
            - the UE may choose to perform relaxed measurement for NR inter-frequency cells of higher priority, or inter-RAT frequency cells of higher priority according to relaxation methods in clauses 4.2.2.10, and 4.2.2.11 in TS 38.133 [8];
The above relaxed measurements and no measurement are not applicable for frequencies that are included in VarMeasIdleConfig, if configured and for which the UE supports dual connectivity or carrier aggregation between those frequencies and the frequency of the current serving cell.

Figure 6:
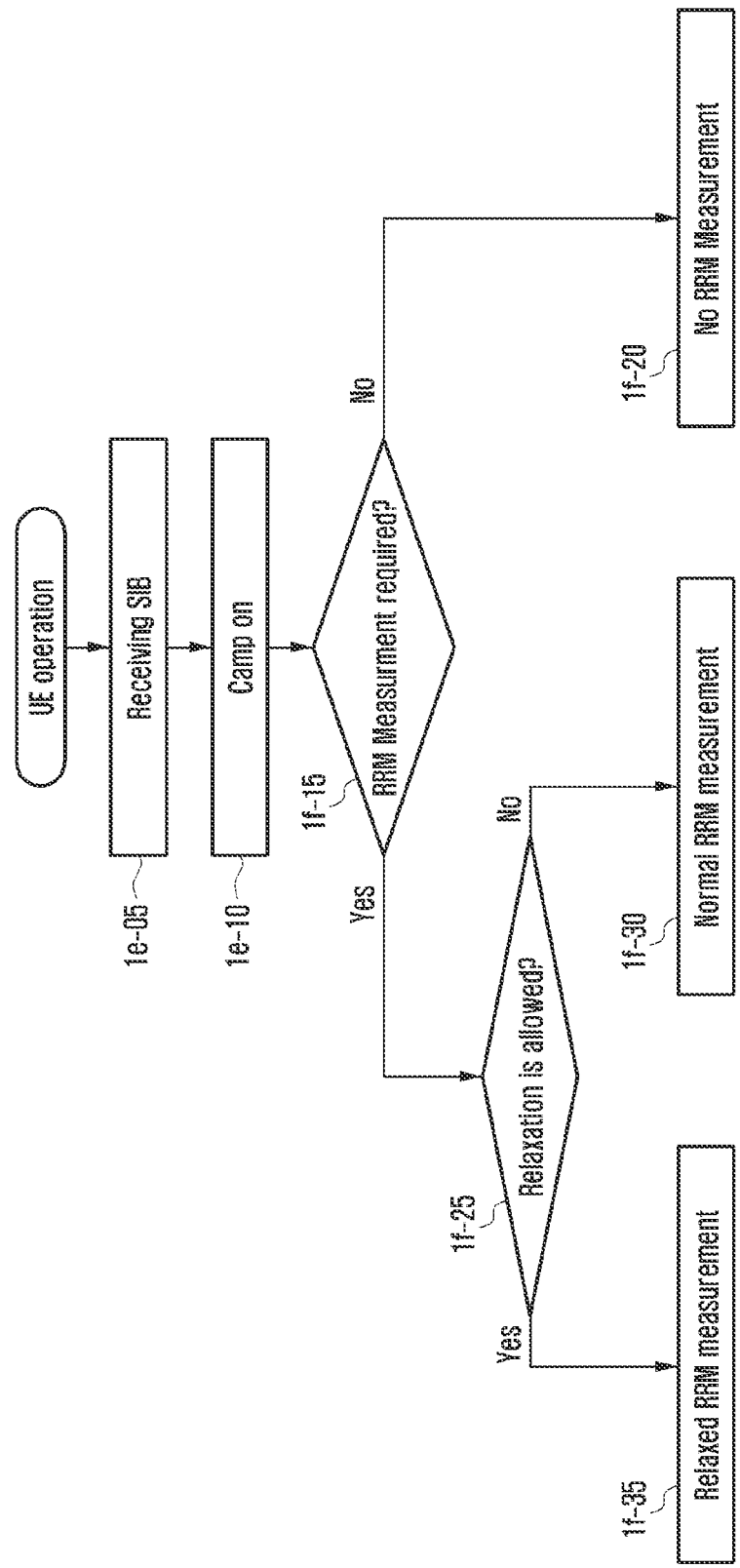
FIG. 6 is an embodiment in which a UE selects normal measurement or relaxed measurement in NR.

FIG. 6 is an embodiment in which a UE selects normal measurement or relaxed measurement in NR.

The UE may receive the SIB and obtain information for RRM measurement relaxation (relaxedMeasurement) (step 1f-05). The UE may camp on one serving cell (step 1f-10).

The UE determines whether RRM measurement for cell reselection is required for each frequency (NR intra frequency, NR inter frequency, or inter-RAT frequency) and each frequency priority (step 1f-15). The operation of the step 1f-15 has been described in detail in the description about FIGS. 3 and 4 and Table 3.

If a predetermined condition is not satisfied at the step 1f-15, the UE may not perform the RRM measurement in the corresponding frequency (step. 1f-20). If the predetermined condition is satisfied at the step 1f-15, the UE determines whether RRM measurement relaxation is allowed in the corresponding frequency (step 1f-25). The detailed operation of the step 1f-25 has been described in the description about FIG. 5.

If a predetermined relaxation condition is not satisfied, the UE performs normal RRM measurement in the corresponding frequency (step 1f-30). A measurement period for the normal measurement is detailed in TS 38.133. If the predetermined relaxation condition is satisfied, the UE performs relaxed RRM measurement (step 1f-35). At this time, the UE can reduce energy consumption by performing measurement with a value greater than the normal measurement period (i.e., less frequently). A measurement period for the relaxed measurements is detailed in TS 38.133 and TS 38.304.

The disclosure proposes a method for improving the above UE operation related to the RRM measurement relaxation in NR.

Specifically, relaxation beyond the conventional RRM relaxation is proposed for a stationary UE or a UE having a limited movement. In the disclosure, a UE that satisfies the same or stricter (more static) condition (i.e., stationary condition or stationary relaxation condition) than the conventional low mobility criterion may be assumed as a stationary UE. That is, the stationary UE (the UE that satisfies the stationary relaxation condition) can sufficiently satisfy the conventional low mobility criterion.

For example, an industrial sensor network, video surveillance, etc. are assumed as a use-case of NR, and most UEs used in this case operate at a fixed location. Also, for example, a wearable device may also maintain a stationary state for a long time. An important feature of the above applications is that a size is smaller than a general UE and therefore a physical size of a battery is also small. Nevertheless, the UE in the above application may be required to operate for a long time (several days to several years)

without battery charging. For example, in the case of the industrial sensor network, numerous UEs are installed for factory automation and event detection, and considerable cost is required to frequently charge these numerous UEs. These UEs are called reduced capability (RedCap) UEs. Therefore, these RedCap UEs require greater energy saving compared to existing NR UEs.

As described in FIGS. 5 and 6, the RRM relaxation is also introduced for energy saving in the existing NR UEs, but the RedCap UEs require much more energy saving than the conventional RRM relaxation. An important fact is that stationary characteristics of the UE can be used. In the case of the stationary UE, the probability that the signal strength from the serving cell remains constant is very high. Therefore, frequent RRM measurements for neighbor cells for cell reselection may waste energy. Considering this, only when the UE is stationary, more RRM measurement relaxation than the existing one can be introduced. However, the disclosure can be applied to all NR or LTE UEs as well as RedCap UEs. In addition, the conditions for the RRM measurement relaxation, the procedure for performing the RRM measurement relaxation, and the RRM measurement relaxation method according to the disclosure can be used not only for the RRC_IDLE or RRC_INACTIVE mode but also for relaxation of the measurement of a UE in the RRM_CONNECTED state.

Figure 7A:
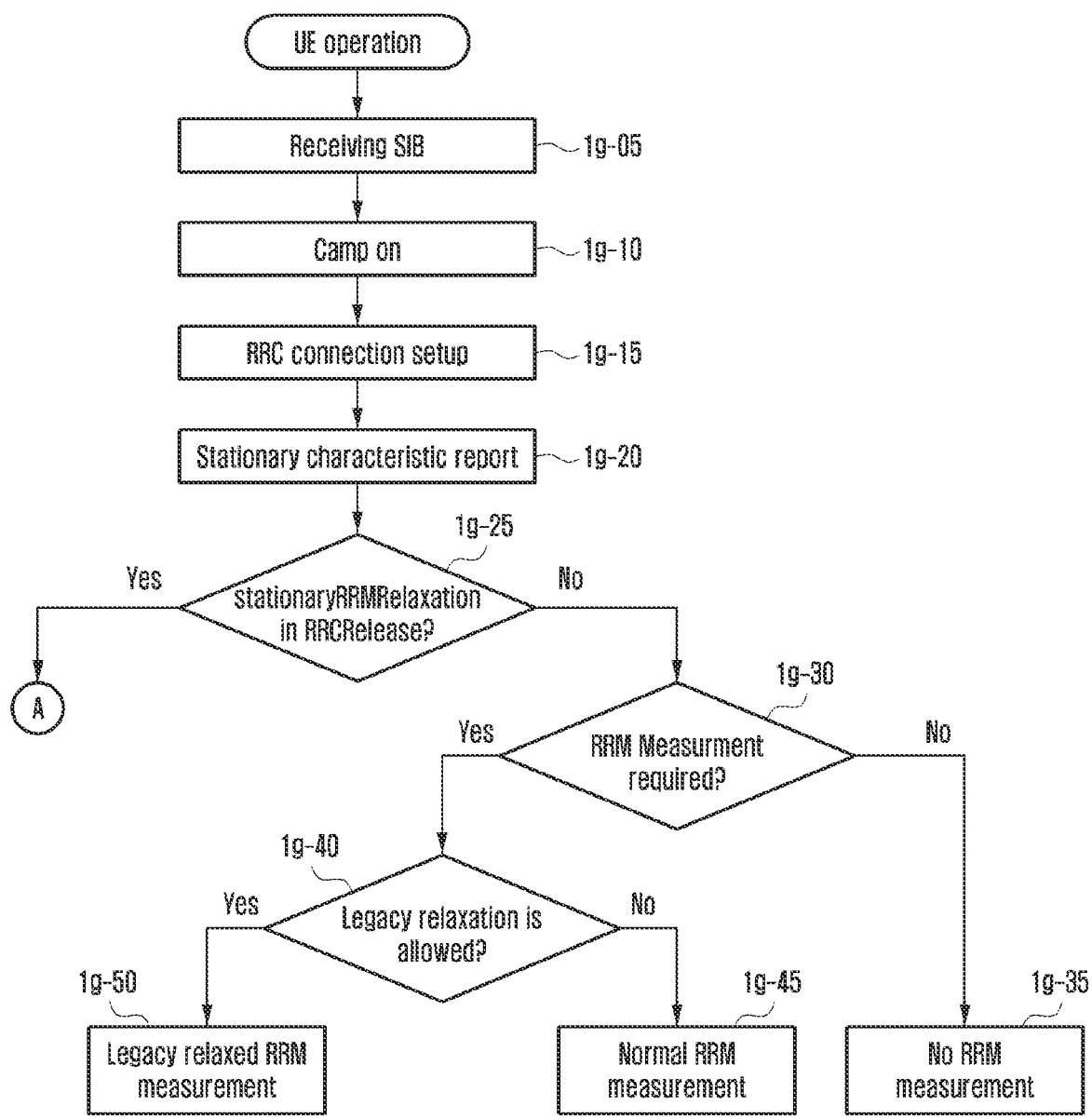
FIG. 7A is a diagram illustrating a process of performing RRM measurement for a stationary UE in an embodiment of the disclosure.
Figure 7B:
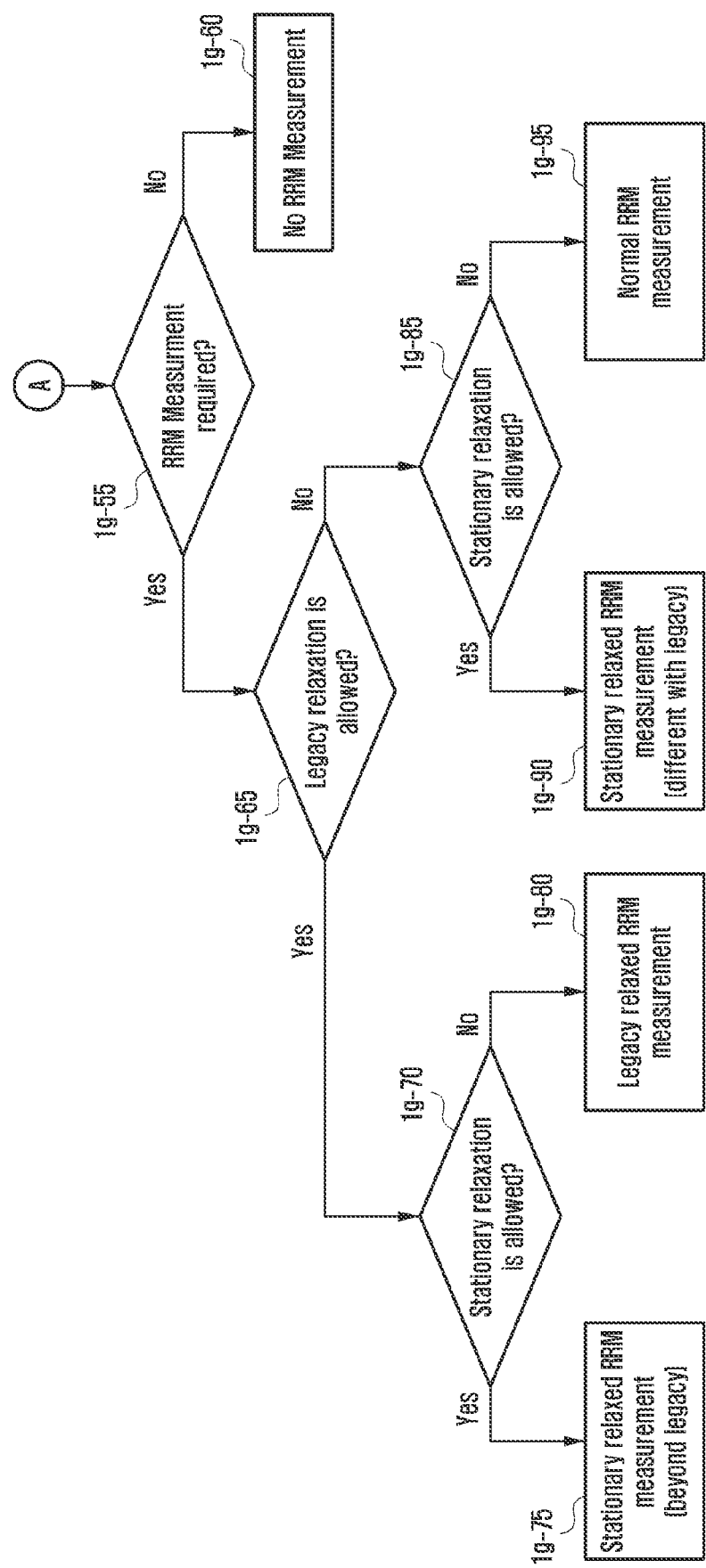
FIG. 7B is a diagram illustrating a process of performing RRM measurement for a stationary UE in an embodiment of the disclosure.

FIGS. 7A and 7B are diagrams illustrating a process of performing RRM measurement for a stationary UE in an embodiment of the disclosure.

The UE receives system information, and the system information may contain parameters for stationary RRM relaxation (or stationary relaxation) as well as conventional RRM relaxation parameters (relaxedMeasurement) (step 1g-05).

Specifically, the UE camps on one cell (step 1g-10). The UE may establish an RRC connection with the cell (step 1g-15). Through the RRC connection, the UE may report its stationary characteristics to a base station (step 1g-20). For example, the UE may transmit the following information through msg5, UEcapabilityInformation, or RRC message, and this information may include some or all of the following.
1. As a unique characteristic (inherent characteristic) of the UE, whether or not it is a stationary device
2. As a unique characteristic (inherent characteristic) of the UE, whether or not it is a device with low mobility
3. Through the measurement of the UE, whether or not it is a stationary device
4. Through the measurement of the UE, whether or not it is a device with low mobility
5. Whether or not the UE supports the stationary RRM relaxation In the case of 1 and 2, it may be information provided from a universal subscriber identity module (USIM) or a higher layer.

If such information on stationary characteristics is not provided from the UE, the base station may not allow the stationary RRM relaxation.

Thereafter, the base station may deliver dedicatedly an indicator (e.g., stationaryRRMRelaxation) for allowing or disallowing the stationary RRM relaxation to the UE through RRCRelease (step 1g-25). Alternatively, the base station may perform the step 1g-25 based on the measurement report on the RRC_CONEECTED mode of the UE without the step 1g-20. Alternatively, at the step 1g-25, the base station may broadcast the stationaryRRMRelaxation through SIB rather than the RRCRelease, and in this case, some or all of the steps 1g-15 and 1g-20 may be omitted.

If the stationary RRM relaxation is disallowed through the stationaryRRMRelaxation indicator, operations from step 1g-30 to step 1g-50 can be performed, which are the same as the legacy operations (operations from step 1f-15 to step 1f-35). If the stationary RRM relaxation is allowed, the UE can perform operations from step 1g-55 to 1g-65, which are the same as operations from step 1f-15 to step 1f-25. However, when the legacy relaxation condition is satisfied at step 1g-65, the UE further determines whether the stationary relaxation condition is satisfied (step 1g-70). The stationary relaxation condition may be one of the following.
1. Reuse the conventional low mobility criterion, and use S-SearchDeltaP-Statioanry that satisfies (S-SearchDeltaP>S-SearchDeltaP-Statioanry) instead of S-SearchDeltaP. Transmit the S-SearchDeltaP-Statioanry value via SIB.
2. Reuse the conventional low mobility criterion, and use T-SearchDeltaP-Statioanry that satisfies (T-SearchDeltaP<T-SearchDeltaP-Statioanry) instead of T-SearchDeltaP. Transmit the T-SearchDeltaP-Statioanry value via SIB.
3. Use the above methods 1 and 2 together.
4. Use the conventional not-at-cell-edge criterion together with the above method 1, 2 or 3 using the conventional low mobility criterion, and use the same S-SearchThresholdP and S-Search ThresholdQ.
5. Reuse the conventional not-at-cell-edge criterion together with the above method 1, 2 or 3 using the conventional low mobility criterion, and use separate values S-SearchThresholdP-Statioanry and S-SearchThresholdQ-Statioanry instead of S-Search ThresholdP and S-SearchThresholdQ. Deliver the above two thresholds via SIB.
6. As a unique characteristic (inherent characteristic) of the UE, in the case where the UE itself knows that it is a stationary device or a device with low mobility Here, as also used in Table 6-1 and Table 6-2, S-SearchDeltaP may refer to a threshold parameter related to a change in received signal strength for cell selection in relaxed measurement, and T-SearchDeltaP may refer to a parameter for a time interval for measuring the change in received signal strength.

Note 1: In the case of methods 4 and 5, in order to satisfy the stationary relaxation condition,
 1) If the gNB configures both the low mobility criterion and the not-at-cell-edge criterion, both conditions should be satisfied.
 2) If the gNB configures only one of the low mobility criterion and the not-at-cell-edge criterion, only the configured condition needs to be satisfied.

Note 2: In the case where the parameter related to the stationary relaxation condition is absent in the SIB, the legacy operation (FIG. 6) is followed.

Note 3: The threshold may be delivered dedicatedly to each UE through an RRC message (e.g., RRCReconfiguration) rather than the SIB.

Note 4: Although it was mentioned above that "the stationary UE (the UE that satisfies the stationary relaxation condition) can sufficiently satisfy the conventional low mobility criterion," there is a need to distinguish between the legacy relaxation condition and the stationary relaxation condition. The reason is that the base station may configure legacy relaxation configuration and stationary relaxation configuration with different criteria. For example, the base station configures only the not-at-cell-edge criterion for legacy relaxation, but it may configure the above method 1, 2, or 3 (corresponding to the conventional low mobility criterion) for stationary relaxation. In this case, satisfying the stationary relaxation condition does not mean that the legacy relaxation condition is satisfied.

Note 5: The stationary relaxation condition may be divided into several stages. For example, stationary UEs may be classified into a completely stationary (stationary1) UE and a UE with minute movement (stationary2). If this is applied to the above method 1, two thresholds can be added, such as S-SearchDeltaP>S-SearchDeltaP-Stioanry2>S-SearchDeltaP-Stioanry1. In this case, S-SearchDeltaP-Stioanry1 is a condition for the stationary1 UE, and S-SearchDeltaP-Stioanry2 is used as a condition for the stationary2 UE. This may be further subdivided into several stages.

Note 6: In the case of the method 6, it may be information provided from USIM or a higher layer.

If the above stationary relaxation condition is satisfied, stationary relaxation beyond legacy relaxation is performed (step 1g-75). This may have one or all of the following meanings:
1. A period longer than legacy relaxed measurement interval (1g-80)
2. The number of frequencies smaller than the number of frequencies performing legacy relaxed measurement (1g-80)

The stationary relaxation may be used with different values (e.g., different measurement periods) for each frequency (intra-frequency, inter-frequency, inter-RAT frequency) and each priority (equal, lower, or higher). Also, it may be used with different values depending on the quality of the serving cell. For example, in the case of intra-frequency, if Srxlev>SIntraSearchP and Squal>SIntraSearchQ are satisfied, a relatively longer measurement period can be obtained compared to the case where they are not satisfied, and in the case of inter-frequency or inter-RAT frequency, if Srxlev>SnonIntraSearchP and Squal>SnonIntraSearchQ are satisfied, a relatively longer measurement period can be obtained compared to the case where they are not satisfied Also, as specified in Note 5, if the stationary relaxation condition is divided into several stages, the relaxation method can be subdivided accordingly. Using the example of Note 5, the measurement can be more relaxed in the situation where (Srxlev$_{Re}$f-Srxlev)<SearchDeltaP-Stioanry1 than in the situation where S-SearchDeltaP-Stioanry1<(SrxlevRef-Srxlev)<S-SearchDeltaP-Statioanry2.

If the stationary relaxation condition is not satisfied at the step 1g-70, the UE performs the legacy relaxation based on the above description in FIG. 5 (step 1g-80). If the legacy relaxation condition is not satisfied at the step 1g-65, but the stationary relaxation condition is satisfied at the step 1g-85, the UE may perform relaxation different from the legacy relaxation (step 1g-90). This may have one or all of the following meanings.
1. A period different from the legacy relaxed measurement interval (1g-80), shorter than the measurement interval at the step 1g-75, and longer than the normal measurement interval (1g-95)
2. The number of frequencies different from the number of frequencies performing legacy relaxed measurement (1g-80), greater than in measurement at the step 1g-75, and smaller than in normal measurement (1g-95)

The stationary relaxation may be used with different values (e.g., different measurement periods) for each frequency (intra-frequency, inter-frequency, inter-RAT frequency) and each priority (equal, lower, or higher). Also, it may be used with different values depending on the quality of the serving cell. For example, in the case of intra-frequency, if Srxlev>SIntraSearchP and Squal>SIntraSearchQ are satisfied, a relatively longer measurement period can be obtained compared to the case where they are not satisfied, and in the case of inter-frequency or inter-RAT frequency, if Srxlev>SnonIntraSearchP and Squal>SnonIntraSearchQ are satisfied, a relatively longer measurement period can be obtained compared to the case where they are not satisfied Also, as specified in Note 5, if the stationary relaxation condition is divided into several stages, the relaxation method can be subdivided accordingly. Using the example of Note 5, the measurement can be more relaxed in the situation where (SrxlevRef-Srxlev)<SearchDeltaP-Stationry1 than in the situation where S-SearchDeltaP-Statioanry1<(SrxlevRef-Srxlev)<S-SearchDeltaP-Statioanry2.

If the stationary relaxation condition is not satisfied at the step 1g-85, the UE performs normal measurement without any relaxation (step 1g-95).

Figure 8A:
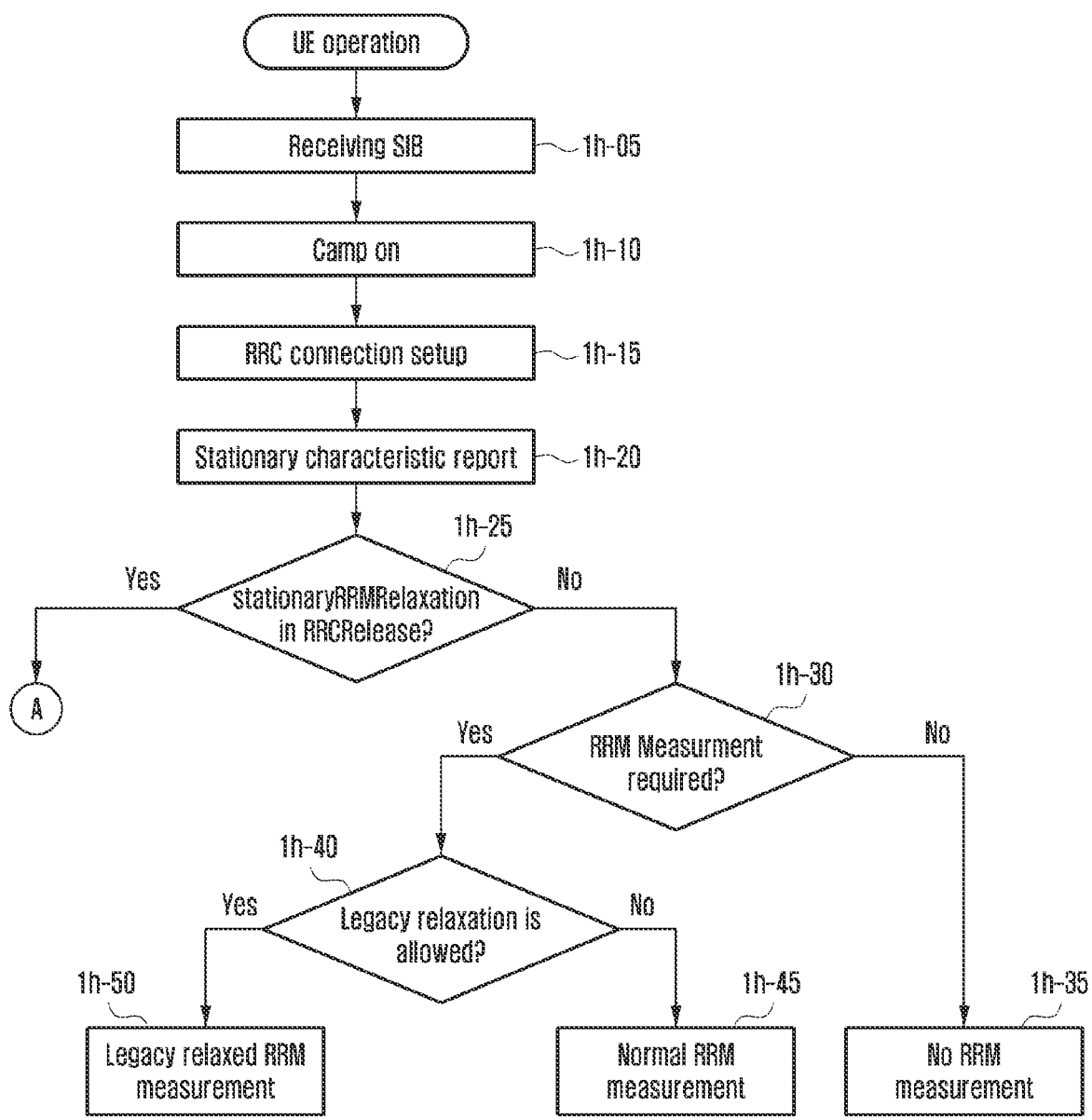
FIG. 8A is a diagram illustrating a process of performing RRM measurement for a stationary UE in another embodiment of the disclosure.
Figure 8B:
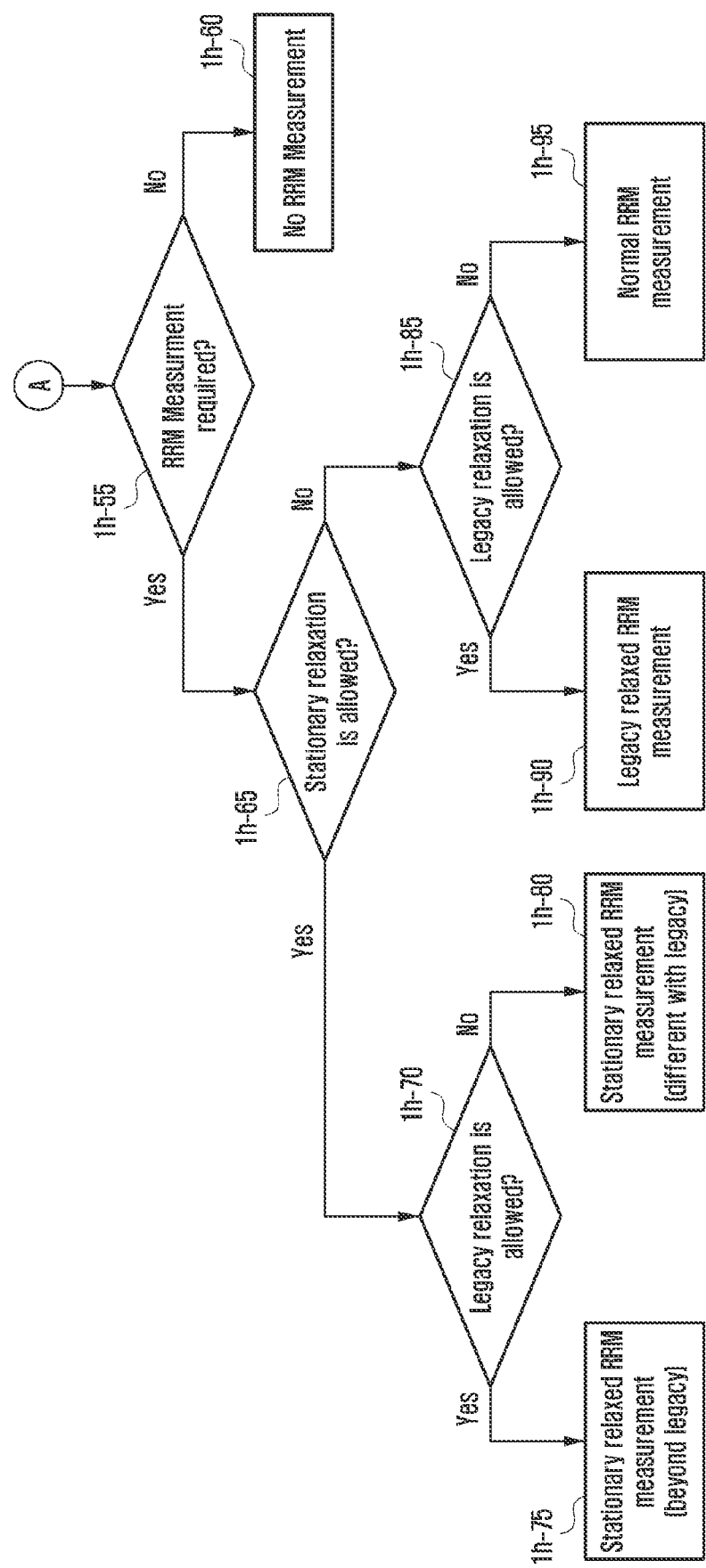
FIG. 8B is a diagram illustrating a process of performing RRM measurement for a stationary UE in another embodiment of the disclosure.

FIGS. 8A and 8B are diagrams illustrating a process of performing RRM measurement for a stationary UE in another embodiment of the disclosure.

The steps from 1h-05 to 1h-60 are the same as the steps from 1g-05 to 1g-60 shown above. At step 1h-65, the UE determines whether the stationary relaxation condition is satisfied. The stationary relaxation conditions refer to the descriptions of FIGS. 7A and 7B. If the stationary relaxation condition is satisfied, the UE determines whether the legacy relaxation condition is satisfied (step 1h-70). A detailed operation of the step 1h-70 is described in the description of FIG. 5.

If the legacy relaxation condition is satisfied at the step 1h-70, the UE may perform stationary relaxation beyond the legacy relaxation (step 1h-75). The description of the step 1h-75 is the same as that of the step 1g-75. If the legacy relaxation condition is not satisfied at the step 1h-70, the UE may perform relaxation different from the legacy relaxation (step 1h-80). The description of the step 1h-80 is the same as that of the step 1g-90. If the stationary relaxation condition is not satisfied at the step 1h-65, the UE determines whether the legacy relaxation condition is satisfied (step 1h-85). A detailed operation of the step 1h-85 is described in the description of FIG. 5. If the legacy relaxation condition is satisfied at the step 1h-85, the UE performs legacy relaxation based on the above description in FIG. 5 (step 1h-90). If the legacy relaxation condition is not satisfied at the step 1h-85, the UE performs normal measurement without any relaxation (step 1h-95).

Figure 9:
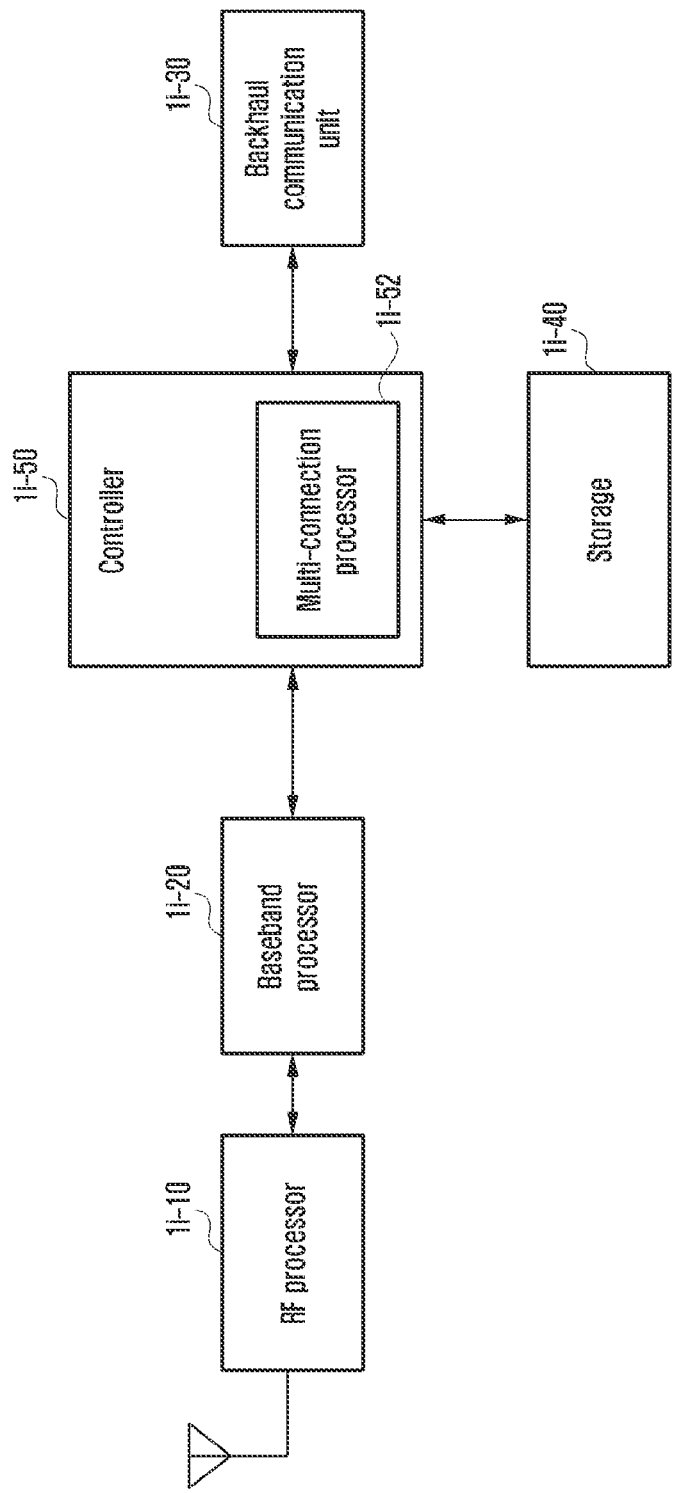
FIG. 9 is a block diagram illustrating an internal structure of a UE according to the disclosure.

FIG. 9 is a block diagram illustrating an internal structure of a UE according to the disclosure.

With reference to this figure, the UE includes a radio frequency (RF) processor 1i-10, a baseband processor 1i-20, a storage 1i-30, and a controller 1i-40.

The RF processor 1i-10 performs functions for transmitting and receiving signals through a wireless channel, such as band conversion and amplification of signals. That is, the RF processor 1i-10 up-converts a baseband signal provided from the baseband processor 1i-20 into an RF band signal, transmits the RF band signal through an antenna, and down-converts an RF band signal received through the antenna into a baseband signal. For example, the RF processor 1i-10 may include a transmit filter, a receive filter, an amplifier, a mixer, an oscillator, a digital to analog converter (DAC), an analog to digital converter (ADC), and the like. Although only one antenna is shown in the figure, the UE may include a plurality of antennas. Also, the RF processor 1i-10 may include a plurality of RF chains. Furthermore, the RF processor 1i-10 may perform beamforming. For the beamforming, the RF processor 1i-10 may adjust the phase and magnitude of signals transmitted and received through a plurality of antennas or antenna elements. Also, the RF processor may perform MIMO and may receive multiple layers when performing the MIMO operation.

The baseband processor 1i-20 performs a conversion function between a baseband signal and a bit stream in accordance with the physical layer standard of the system. For example, upon data transmission, the baseband processor 1i-20 generates complex symbols by encoding and modulating a transmission bit stream. In addition, upon data reception, the baseband processor 1i-20 restores a received bit stream by demodulating and decoding baseband signals provided from the RF processor 1i-10. For example, in the case of orthogonal frequency division multiplexing (OFDM) scheme, upon data transmission, the baseband processor 1i-20 generates complex symbols by encoding and modulating a transmission bit stream, maps the complex symbols to subcarriers, and configures OFDM symbols through an inverse fast Fourier transform (IFFT) operation and a cyclic prefix (CP) insertion. In addition, upon data reception, the baseband processor 1i-20 divides baseband signals provided from the RF processor 1i-10 into OFDM symbol units, restores signals mapped to subcarriers through a fast Fourier transform (FFT) operation, and restores a received bit stream through demodulation and decoding.

The baseband processor 1i-20 and the RF processor 1i-10 transmit and receive signals as described above. Accordingly, the baseband processor 1i-20 and the RF processor 1i-10 may be referred to as a transmitter, a receiver, a transceiver, or a communication unit. Furthermore, at least one of the baseband processor 1i-20 and the RF processor 1i-10 may include a plurality of communication modules to support a plurality of different radio access technologies. In addition, at least one of the baseband processor 1i-20 and the RF processor 1i-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band and a millimeter wave (e.g., 60 GHz) band.

The storage 1i-30 stores a default program for operation of the UE, an application program, and data such as configuration information. In particular, the storage 1i-30 may store information related to a second access node performing wireless communication using a second radio access technology. Also, the storage 1i-30 provides the stored data in response to the request of the controller 1i-40.

The controller 1i-40 controls the overall operations of the UE. For example, the controller 1i-40 transmits and receives signals through the baseband processor 1i-20 and the RF processor 1i-10. In addition, the controller 1i-40 writes and reads data in and from the storage 1i-30. To this end, the controller 1i-40 may include at least one processor. For example, the controller 1i-40 may include a communication processor (CP) for controlling communication and an application processor (AP) for controlling a higher layer such as an application program.

Figure 10:
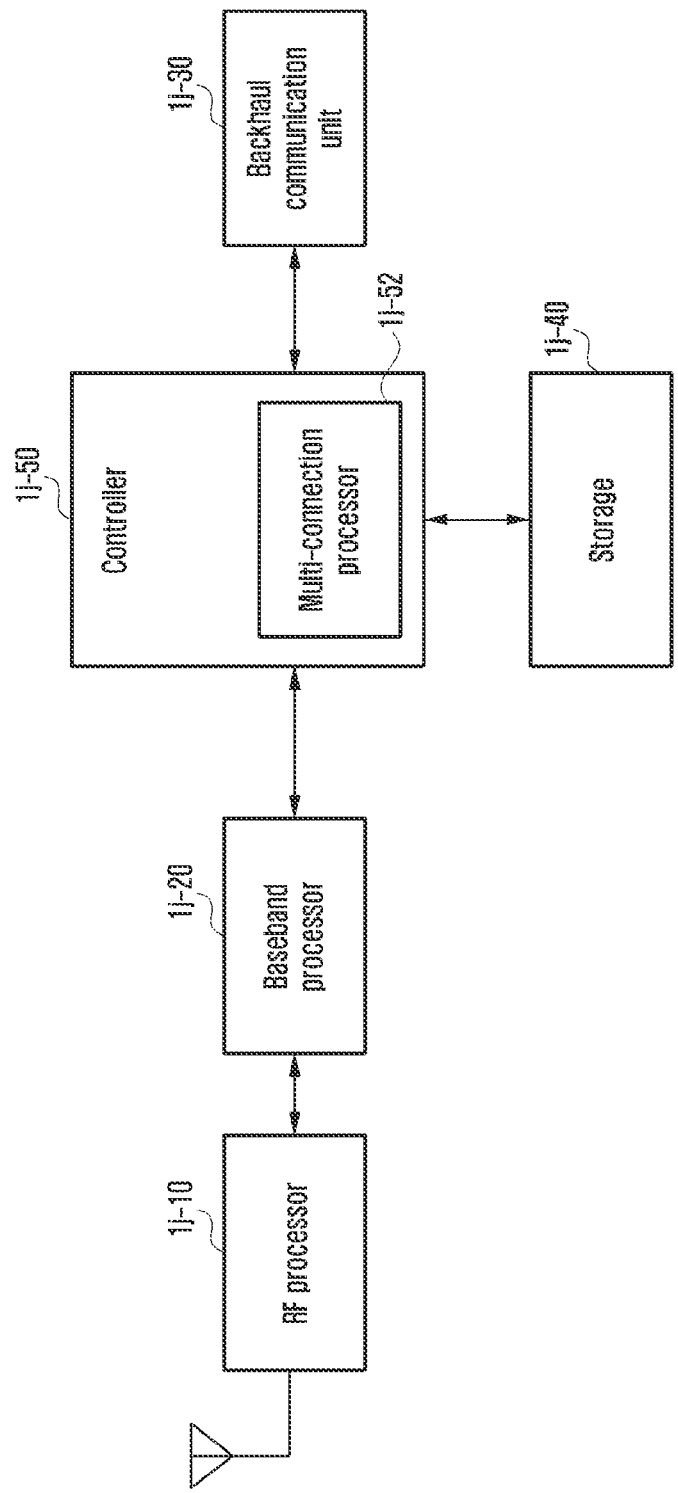
FIG. 10 is a block diagram illustrating a configuration of a base station according to the disclosure.

FIG. 10 is a block diagram illustrating a configuration of a base station according to the disclosure.

As shown in this figure, the base station includes an RF processor 1j-10, a baseband processor 1j-20, a backhaul communication unit 1j-30, a storage 1j-40, and a controller 1j-50.

The RF processor 1j-10 performs functions for transmitting and receiving signals through a wireless channel, such as band conversion and amplification of signals. That is, the RF processor 1j-10 up-converts a baseband signal provided from the baseband processor 1j-20 into an RF band signal, transmits the RF band signal through an antenna, and down-converts an RF band signal received through the antenna into a baseband signal. For example, the RF processor 1j-10 may include a transmit filter, a receive filter, an amplifier, a mixer, an oscillator, a DAC, an ADC, and the like. Although only one antenna is shown in the figure, the first access node may include a plurality of antennas. Also, the RF processor 1j-10 may include a plurality of RF chains. Furthermore, the RF processor 1j-10 may perform beamforming. For the beamforming, the RF processor 1j-10 may adjust the phase and magnitude of signals transmitted and received through a plurality of antennas or antenna elements. Also, the RF processor may perform MIMO and may receive multiple layers when performing the MIMO operation.

The baseband processor 1j-20 performs a conversion function between a baseband signal and a bit stream in accordance with the physical layer standard of the first radio access technology. For example, upon data transmission, the baseband processor 1j-20 generates complex symbols by encoding and modulating a transmission bit stream. In addition, upon data reception, the baseband processor 1j-20 restores a received bit stream by demodulating and decoding baseband signals provided from the RF processor 1j-10. For example, in the case of OFDM scheme, upon data transmission, the baseband processor 1j-20 generates complex symbols by encoding and modulating a transmission bit stream, maps the complex symbols to subcarriers, and configures OFDM symbols through an IFFT operation and a CP insertion. In addition, upon data reception, the baseband processor 1j-20 divides baseband signals provided from the RF processor 1j-10 into OFDM symbol units, restores signals mapped to subcarriers through an FFT operation, and restores a received bit stream through demodulation and decoding. The baseband processor 1j-20 and the RF processor 1j-10 transmit and receive signals as described above. Accordingly, the baseband processor 1j-20 and the RF processor 1j-10 may be referred to as a transmitter, a receiver, a transceiver, a communication unit, or a wireless communication unit.

The backhaul communication unit 1j-30 provides an interface for communicating with other nodes in the network. That is, the backhaul communication unit 1j-30 converts a bit stream transmitted from the main base station to another node, for example, a secondary base station, a core network, etc. into a physical signal, and converts a physical signal received from the other node into a bit stream.

The storage 1j-40 stores a default program for operation of the main base station, an application program, and data such as configuration information. In particular, the storage 1j-40 may store information on a bearer allocated to a connected UE, measurement results reported from the connected UE, and the like. In addition, the storage 1j-40 may store information that is a criterion for determining whether to provide or stop multiple connections to the UE. Also, the storage 1j-40 provides the stored data in response to the request of the controller 1j-50.

The controller 1j-50 controls the overall operations of the main base station. For example, the controller 1j-50 transmits and receives signals through the baseband processor 1j-20 and the RF processor 1j-10 or through the backhaul communication unit 1j-30. In addition, the controller 1j-50 writes and reads data in and from the storage 1i-40. To this end, the controller 1j-50 may include at least one processor.

In the specific embodiments of the disclosure described above, components included in the disclosure are expressed in the singular or the plural according to the presented specific embodiments. However, the singular or plural expression is appropriately selected for the presented situation for convenience of description, and the disclosure is not limited to the singular or plural components, and even if the component is expressed in the plural, the component may be configured with the singular, or even if the component is expressed in the singular, the component may be configured with the plural.

Although specific embodiments have been described in the detailed description of the disclosure, various modifications are possible without departing from the scope of the disclosure. Therefore, the scope of the disclosure should not be limited to the described embodiments and should be defined by claims set forth below as well as equivalents to claims.

The invention claimed is:

1. A method performed by a terminal in a wireless communication system, the method comprising:
    identifying whether the terminal is a stationary device based on a measurement;
    in case that the terminal is the stationary device, transmitting, to a base station, information on stationary characteristics of the terminal;
    receiving, from the base station, first information on a parameter associated with a first relaxed measurement criterion for stationary mobility and second information on a parameter associated with a second relaxed measurement criterion for low mobility;
    identifying whether the first relaxed measurement criterion is fulfilled based on the first information;
    in case that the first relaxed measurement criterion is fulfilled, identifying whether the second relaxed measurement criterion is fulfilled;
    in case that the second relaxed measurement criterion is fulfilled, performing a stationary relaxation measurement for at least one first frequency; and
    in case that the second relaxed measurement criterion is not fulfilled, performing the stationary relaxation measurement for at least one second frequency,
    wherein a number of the at least one first frequency is less than a number of frequencies for a relaxed measurement associated with the low mobility, and
    wherein a number of the at least one second frequency is greater than the number of frequencies for the relaxed measurement associated with the low mobility.

2. The method of claim 1, further comprising:
    in case that the first relaxed measurement criterion is not fulfilled and the second relaxed measurement criterion is fulfilled, performing the relaxed measurement associated with the low mobility; and
    in case that the first relaxed measurement criterion is not fulfilled and the second relaxed measurement criterion is not fulfilled, performing a normal measurement for a radio resource management (RRM).

3. The method of claim 1,
    wherein the first information includes a first threshold and a first period, and the second information includes a second threshold and a second period, and
    wherein the first threshold and the second threshold are associated with a change of received signal strength for a cell of the base station and the first period and the second period are time intervals during which the change of the received signal strength is measured.

4. The method of claim 1, further comprising:
    receiving, from the base station, an indicator for allowing the terminal to perform the stationary relaxation measurement.

5. A terminal in a wireless communication system, the terminal comprising:
    a transceiver; and
    a controller configured to:
        identify whether the terminal is a stationary device based on a measurement,
        in case that the terminal is the stationary device, control the transceiver to transmit, to a base station, information on stationary characteristics of the terminal,
        control the transceiver to receive, from the base station, first information on a parameter associated with a first relaxed measurement criterion for stationary mobility and second information on a parameter associated with a second relaxed measurement criterion for low mobility,
        identify whether the first relaxed measurement criterion is fulfilled based on the first information,
        in case that the first relaxed measurement criterion is fulfilled, identify whether the second relaxed measurement criterion is fulfilled,
        in case that the second relaxed measurement criterion is fulfilled, perform a stationary relaxation measurement for at least one first frequency,
        in case that the second relaxed measurement criterion is not fulfilled, perform the stationary relaxation measurement for at least one second frequency,
    wherein a number of the at least one first frequency is less than a number of frequencies for a relaxed measurement associated with the low mobility, and
    wherein a number of the at least one second frequency is greater than the number of frequencies for the relaxed measurement associated with the low mobility.

6. The terminal of claim 5,
    wherein the controller is further configured to perform the relaxed measurement associated with the low mobility, in case that the first relaxed measurement criterion is not fulfilled and the second relaxed measurement criterion is fulfilled, and perform a normal measurement for a radio resource management (RRM), in case that the first relaxed measurement criterion is not fulfilled and the second relaxed measurement criterion is not fulfilled.

7. The terminal of claim 5,
    wherein the first information includes a first threshold and a first period, and the second information includes a second threshold and a second period, and
    wherein the first threshold and the second threshold are associated with a change of received signal strength for a cell of the base station and the first period and the second period are time intervals during which the change of the received signal strength is measured.

8. The terminal of claim 5,
    wherein the controller is further configured to control the transceiver to receive, from the base station, an indicator for allowing the terminal to perform the stationary relaxation measurement.

* * * * *